(12) United States Patent
Weir

(10) Patent No.: US 9,091,561 B1
(45) Date of Patent: Jul. 28, 2015

(54) NAVIGATION SYSTEM FOR ESTIMATING ROUTES FOR USERS

(71) Applicant: TOYOTA JIDOSHA KABUSHIKI KAISHA, Toyota-shi, Aichi-ken (JP)

(72) Inventor: David Frank Russell Weir, San Jose, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/065,170

(22) Filed: Oct. 28, 2013

(51) Int. Cl.
*G01M 17/00* (2006.01)
*G01C 21/34* (2006.01)

(52) U.S. Cl.
CPC .................................. *G01C 21/3484* (2013.01)

(58) Field of Classification Search
None
See application file for complete search history.

(56) References Cited

U.S. PATENT DOCUMENTS

| | | | |
|---|---|---|---|
| 6,198,395 B1 | 3/2001 | Sussman | |
| 6,320,496 B1 | 11/2001 | Sokoler et al. | |
| 6,486,784 B1 | 11/2002 | Beckers | |
| 6,662,141 B2 * | 12/2003 | Kaub | 702/181 |
| 6,744,370 B1 | 6/2004 | Sleichter, III et al. | |
| 6,774,788 B1 | 8/2004 | Balfe | |
| 7,610,151 B2 * | 10/2009 | Letchner et al. | 701/424 |
| 7,986,828 B2 | 7/2011 | Rao et al. | |
| 8,166,421 B2 | 4/2012 | Magal et al. | |
| 8,583,661 B2 * | 11/2013 | Fujii et al. | 707/749 |
| 2002/0076100 A1 | 6/2002 | Luo | |
| 2003/0037720 A1 | 2/2003 | Stockton | |
| 2004/0091153 A1 | 5/2004 | Nakano et al. | |
| 2004/0210358 A1 * | 10/2004 | Suzuki et al. | 701/23 |
| 2006/0149621 A1 | 7/2006 | Do et al. | |
| 2008/0004802 A1 * | 1/2008 | Horvitz | 701/209 |
| 2008/0112592 A1 | 5/2008 | Wu et al. | |
| 2008/0120025 A1 * | 5/2008 | Naitou et al. | 701/207 |
| 2008/0120029 A1 | 5/2008 | Zelek et al. | |
| 2008/0312709 A1 | 12/2008 | Volpe et al. | |
| 2009/0252423 A1 | 10/2009 | Zhu et al. | |
| 2010/0106603 A1 * | 4/2010 | Dey et al. | 705/14.63 |
| 2010/0302138 A1 | 12/2010 | Poot et al. | |
| 2010/0332126 A1 | 12/2010 | Huang et al. | |
| 2011/0044506 A1 | 2/2011 | Chen | |
| 2011/0054781 A1 | 3/2011 | Ohkubo | |
| 2011/0210915 A1 | 9/2011 | Shotton et al. | |
| 2011/0213628 A1 * | 9/2011 | Peak et al. | 705/4 |

(Continued)

OTHER PUBLICATIONS

Balachandran, Wamadeva et al., "A GPS Based Navigation Aid for the Blind," 17th International Conference on Applied Electromagnetics and Communications, Croatia, Oct. 1-3, 2003, pp. 34-36.

(Continued)

*Primary Examiner* — Calvin Cheung
(74) *Attorney, Agent, or Firm* — Patent Law Works LLP

(57) ABSTRACT

The disclosure includes a system and method for generating a probability model used to estimate most likely routes for users. The system includes one or more processors configured to retrieve route data describing historical routes traveled by a group of users and map date describing a map, match the historical routes to the map, identify one or more intersections associated with the historical routes on the map, determine a maneuver ratio for one of the intersections based on the route data, and generate a probability model including one or more maneuver ratios for the one or more intersections. A maneuver ratio describes a ratio of a maneuver that the group of users has taken at the one of the intersections.

20 Claims, 11 Drawing Sheets

(56) References Cited

U.S. PATENT DOCUMENTS

| | | |
|---|---|---|
| 2011/0249865 A1 | 10/2011 | Lee et al. |
| 2011/0307172 A1 | 12/2011 | Jadhav et al. |
| 2011/0309926 A1* | 12/2011 | Eikelenberg et al. ......... 340/439 |
| 2011/0317871 A1 | 12/2011 | Tossell et al. |
| 2012/0070070 A1 | 3/2012 | Litvak |
| 2012/0095681 A1* | 4/2012 | An et al. ...................... 701/527 |
| 2012/0150429 A1 | 6/2012 | Siotos |
| 2012/0184884 A1 | 7/2012 | Dyer et al. |
| 2013/0000156 A1 | 1/2013 | Andoh |
| 2013/0218456 A1 | 8/2013 | Zelek et al. |
| 2013/0265225 A1 | 10/2013 | Nasiri et al. |
| 2013/0317944 A1 | 11/2013 | Huang et al. |
| 2014/0009268 A1 | 1/2014 | Oshima et al. |
| 2014/0018985 A1* | 1/2014 | Gupta et al. ................... 701/22 |
| 2014/0114574 A1 | 4/2014 | Tertoolen et al. |
| 2014/0180526 A1 | 6/2014 | Deshpande et al. |

OTHER PUBLICATIONS

Edwards, Nathan et al., "A Pragmatic Approach to the Design and Implementation of a Vibrotactile Belt and Its Applications," 6 pages.

Heuten, Wilko et al., "Tactile Wayfinder: A Non-Visual Support System for Wayfinding," Proceedings: NordiCHI 2008, Oct. 20-22, 2008, 10 pages.

Koenig, Nathan, "Toward Real-Time Human Detection and Tracking in Diverse Environments," 5 pages.

Kulyukin, Vladimir et al., "A Robotic Wayfinding System for the Visually Impaired," 6 pages.

Melvin, A. Allan et al., "ROVI: A Robot for Visually Impaired for Collision-Free Navigation," Proceedings of the International Conference on Man-Machine Systems (ICoMMS), Malaysia, Oct. 11-13, 2009, 6 pages.

Pandey, Amit Kumar et al., "Towards a Sociable Robot Guide which Respects and Supports the Human Activity," 5th Annual IEEE Conference on Automation Science and Engineering, India, Aug. 22-25, 2009, 6 pages.

Pielot, Martin et al., "Evaluation of Continution Direction Encoding with Tactile Belts," 10 pages.

Rosenthal, Jacob et al., "Design Implementation and Case Study of a Pragmantic Vibrotactile Belt," 10 pages.

Spinello, Luciano et al., "A Layered Approach to People Detection in 3D Range Data," 6 pages.

Tsukada, Koji et al., "ActiveBelt: Belt-type Wearable Tactile Display for Directional Navigation," 16 pages.

Ulrich, Iwan et al., "The GuideCane—Applying Mobile Robot Technoloiges to Assist the Visually Impaired," IEEE Transactions on Systems, Man and Cybernetics—Part A: Systems and Humans, vol. 31, No. 2, Mar. 2001 pp. 131-136.

Van Erp, Jan B.F. et al., "Waypoint Navigation with a Virobtactile Waist Belt," ACM Transactions on Applied Perception, vol. 2, No. 2, Apr. 2005, pp. 106-117.

Xia, Lu et al., "Human Detection Using Depth Information by Kinect," 8 pages.

Koenig, "Toward Real-Time Human Detection and Tracking in Diverse Environments," IEEE 6th International Conference on Development and Learning (2007), pp. 94-98.

Fritsch, "Multi-modal anchoring for human-robot interaction," Robotics and Autonomous Systems 43 (2003) pp. 133-147.

* cited by examiner

NAVIGATION SYSTEM FOR ESTIMATING ROUTES FOR USERS

BACKGROUND

1. Field of the Invention

The specification relates to a navigation system for estimating journey routes for users. In particular, the specification relates to a navigation system for building probability models and estimating most likely routes for users based on the probability models.

2. Description of the Background Art

Users are increasingly relying on navigational systems on computing devices to provide useful information during travelling. When a user travels, the user is usually following in the footsteps of other travelers. These other travels, in aggregation, provide information that can be used to estimate likely journey routes and potential stopping points such as attractions, amenities, incidents, etc. By estimating journey routes of travelers, a navigation system can provide useful information, such as traffic delays or road closures, to the travelers. However, the existing navigation systems often need the travelers to input starting points and/or destinations of journeys before estimating journey routes of the travelers and providing useful traffic information to the travelers.

Another problem of the existing navigation systems is that they use traffic field studies to measure maneuver ratios at intersections by sitting at an intersection and counting the vehicles as they pass. Repeating this for several intersections enables the navigation systems to build models of how traffic flows for particular parts of town. However, this approach is very expensive, time-consuming and only captures a snapshot of the traffic flow. In particular, it is impossible to determine the origin and destination of each vehicle as they pass through the intersection, making a full model difficult.

SUMMARY

The system overcomes the deficiencies of the prior art with systems and methods for generating a probability model used to estimate most likely routes for users. In one embodiment, the system includes a probability module comprising a communication module, a route module, an intersection extractor, a modeling module and an estimation module. The communication module retrieves route data describing historical routes traveled by a group of users and map date describing a map. The route module matches the historical routes to the map. The intersection extractor identifies one or more intersections associated with the historical routes on the map. The modeling module determines a maneuver ratio for one of the intersections based on the route data and generates a probability model including one or more maneuver ratios for the one or more intersections. A maneuver ratio describes a ratio of a maneuver that the group of users has taken at the one of the intersections. In some embodiments, the maneuver includes one or more of a right turn, a left turn, a U-turn and going straight.

In some embodiments, the modeling module also determines one or more journey factors associated with the historical routes traveled by the group of first users and associated with the one or more intersections and determines the probability model based on the one or more journey factors. For example, the probability model corresponds to the one or more journey factors and is generated based on the historical routes characterized by the one or more journey factors. In some embodiments, the one or more journey factors include one or more of a day of a week, a time of a day, weather of a day, whether a day is a national holiday, whether it is raining during a day, what a starting point of one of the historical routes is, what a destination of one of the historical routes is, what a stopping point along one of the historical routes is, an elapsed distance of one of the historical routes and an elapsed time of one of the historical routes.

In some embodiments, the estimation module retrieves position data associated with a second user, wherein the position data describes a position of the second user on the map, estimates probabilities for a set of routes that the second user may take based on the probability model and determines a most likely route for the second user from the set of routes based on the probabilities for the set of routes. In some embodiments, the estimation module also identifying an intersection associated with the second user, calculates probabilities of maneuvers that the second user may take at the intersection based on the probability model and determines a most likely maneuver that the second user may take at the intersection based on the probabilities of maneuvers. In some other embodiments, the estimation module determines one or more journey factors associated with the second user and calculates probabilities of maneuvers that the second user may take at the intersection based on the probability model and the one or more journey factors.

The system is particularly advantageous in numerous respects. First, the system creates a probability model without requiring users to input origins or destinations. Second, the system can anticipate most likely journey routes for users based on the probability model, without knowing origins or destinations of the users. Third, the system determines maneuver ratios at intersections based on historical routes traveled by users in order to build the probability model, therefore with a low expense and a high efficiency.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION

Figure 1:
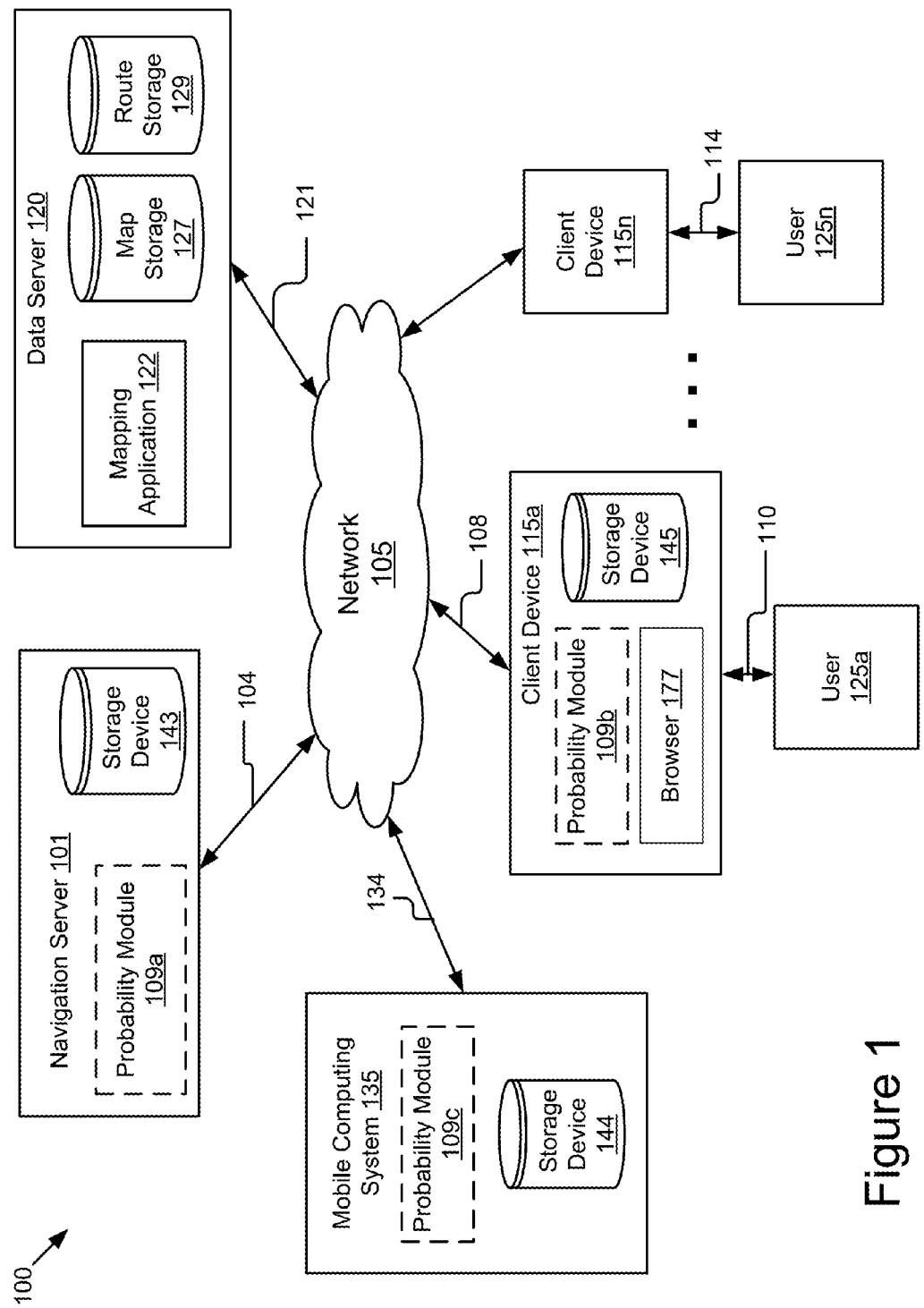
FIG. 1 is a high-level block diagram illustrating one embodiment of a system for generating a probability model and estimating most likely routes for users.

A system and method for generating a probability model and estimating most likely routes for users based on the probability model are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to client devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for generating a probability model and estimating most likely routes for users based on the probability model. The illustrated system 100 includes a navigation server 101, a client device 115, a mobile computing system 135 and a data server 120 that are communicatively coupled via a network 105. In FIG. 1 and the remaining figures, a reference number with a following letter, e.g., "115a," represents a reference to the element having that particular reference number. A reference number in the text without a following letter, e.g., "115," represents a general reference to instances of the element bearing that reference number.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the, navigation server 101, the client device 115, the mobile computing system 135 and the data server 120, in practice one or more networks 105 can be connected to these entities.

In one embodiment, a probability module 109a is operable on the navigation server 101, which is coupled to the network via signal line 104. The navigation server 101 can be a hardware server that includes a processor, a memory and network communication capabilities. In some embodiments, the navigation server 101 sends and receives data to and from one or more of the data server 120, the client device 115a, 115n and the mobile computing system 135. The navigation server 101 also includes a storage device 143, which includes registration data for users, routes (e.g. new routes and historical routes), intersections, maps, probability models describing maneuver ratios for intersections, etc.

In another embodiment, a probability module 109b is operable on a client device 115a, which is connected to the network via signal line 108. In some embodiments, the client device 115a, 115n sends and receives data to and from one or more of the navigation server 101, the data server 120 and the mobile computing system 135. The client device 115a, 115n is a computing device that includes a memory and a processor, for example a laptop computer, a desktop computer, a tablet computer, a mobile telephone, a personal digital assistant (PDA) or a mobile email device. In some embodiments, the client device 115a includes a browser 177 for accessing online services and a storage device 145 for storing registration data for users, routes (e.g., historical routes), intersections, maps, probability models describing maneuver ratios at intersections, etc. In one embodiment, the probability module 109b anticipates routes that a user 125 might take, pre-fetches the routes and stores the routes in the storage device 145. In the illustrated embodiment, the user 125a interacts with the client device 115a via signal line 110. The user 125n interacts with the client device 115n via signal line 114.

In some instances, a probability module 109b acts in part as a thin-client application that may be stored on the client device 115a, 115n and in part as components that may be stored on the navigation server 101. For example, the navigation server 101 stores the user data in the storage device 143 and estimates a route for the user 125a. The probability module 109b sends useful information associated with the route to the browser 177 to display the content.

In some embodiments, a probability module 109c is operable on a mobile computing system 135, which is coupled to the network 105 via signal line 134. In some embodiments, the mobile computing system 135 sends and receives data to and from one or more of the navigation server 101, the data server 120 and the client device 115a, 115n. The mobile computing system 135 is any computing device that includes a memory and a processor. In one embodiment, the mobile computing system 135 is one of a vehicle, an automobile, a bus, a bionic implant or any other mobile system with non-transitory computer electronics (e.g., a processor, a memory or any combination of non-transitory computer electronics). In some embodiments, the mobile computing system 135 includes a storage device 144 for storing registration data for users, routes (e.g., historical routes), intersections, maps, probability models describing maneuver ratios for intersections, etc. In one embodiment, the probability module 109c anticipates routes that the user might take, pre-fetches the routes and stores the routes in the storage device 144.

The probability module 109 is code and routines for generating a probability model and estimating most likely routes for users 125 based on the probability model. In some embodiments, the probability module 109 retrieves route data describing historical routes traveled by a group of users 125 and map date describing a map, matches the historical routes to the map, identifies intersections associated with the historical routes on the map, determines a maneuver ratio for one of the intersections and generates an intersection probability model including maneuver ratios for the intersections. In some embodiments, a maneuver ratio for one intersection describes a ratio of a maneuver that the group of users 125 has taken. For example, the probability module 109 calculates a ratio of a maneuver (e.g., a left turn) that the users 125 took at one intersection based on the historical routes traveled by the group of users 125.

In some embodiments, the probability module 109 retrieves position data associated with a user 125. For example, the position data describes a position of the user 125 on a map. The probability module 109 estimates probabilities for a set of routes that the user 125 may take based on the intersection probability model and determines a most likely route for the user 125 from the set of routes based on the probabilities for the set of routes. For example, the probability module 109 determines a route with the highest probability of being taken by the user 125 as the most likely route. The probability module 109 will be described in further detail with reference to FIG. 2.

The data server 120 comprises a mapping application 122, a map storage 127 and a route storage 129. In the illustrated embodiment, the data server 120 is connected to the network 105 via signal line 121. In some embodiments, the mapping application 122 receives a request for a map from the probability module 109. For example, the probability module 109 requests a map describing one or more freeways or portions of freeways between multiple intersections. In some embodiments, the mapping application 122 fetches map data describing a map from the map storage 127 and sends the map data to the probability module 109. In some embodiments, the mapping application 122 receives a request for historical routes traveled by users 125 during a certain period of time and in a certain area from the probability module 109. The mapping application 122 fetches route data describing historical routes traveled by users 125 from the route storage 129 and transmits the route data to the probability module 109. In some other embodiments, the mapping application 122 generates additional or different information relating to navigation. For example, the information relating to navigation includes, but not limited to, real-time traffic updates, construction updates, etc.

Example Probability Module

Figure 2:
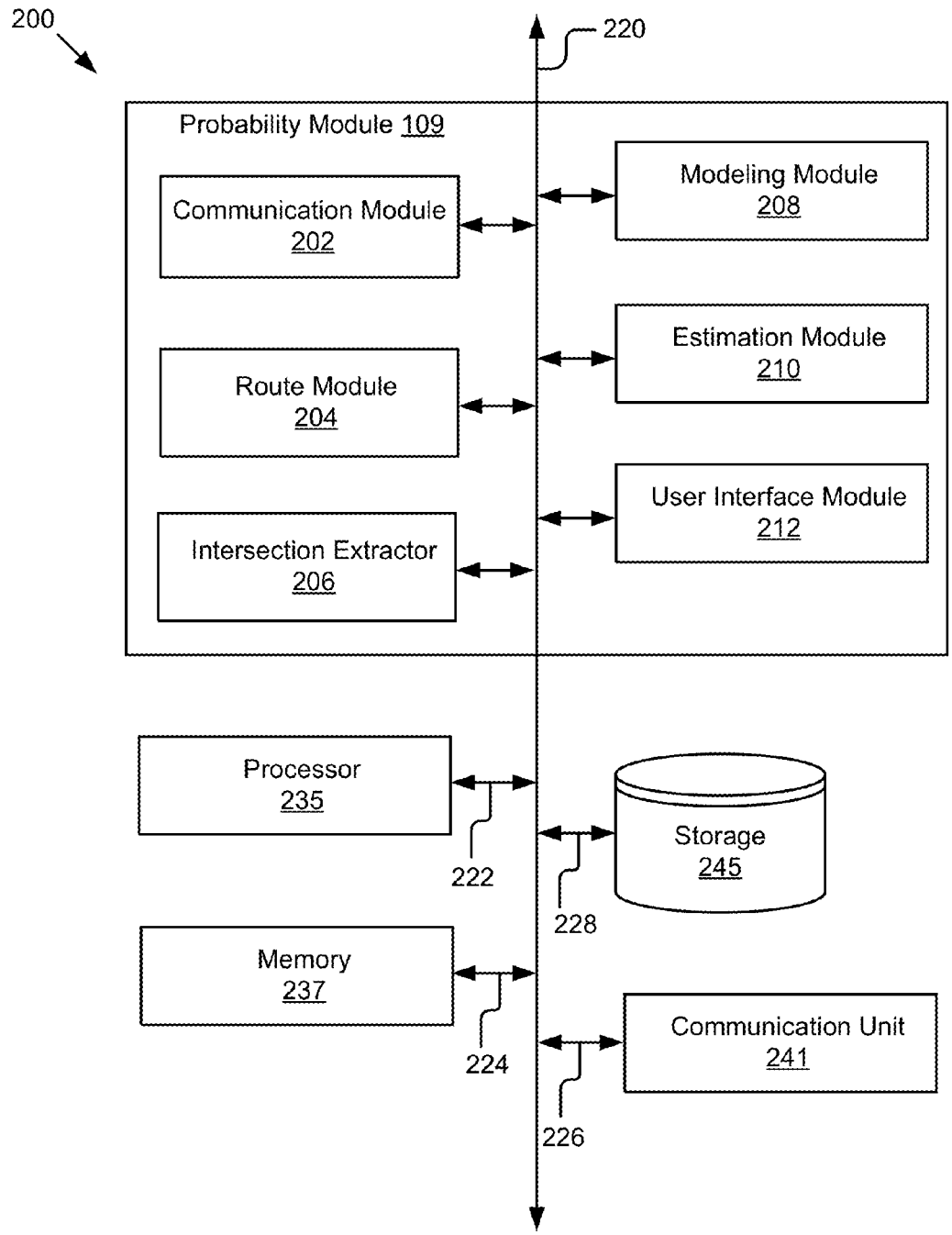
FIG. 2 is a block diagram illustrating one embodiment of a probability module.

Referring now to FIG. 2, an example of the probability module 109 is shown in more detail. FIG. 2 is a block diagram of a computing device 200 that includes a probability module 109, a processor 235, a memory 237, a communication unit 241 and a storage device 245 according to some embodiments. The components of the computing device 200 are communicatively coupled by a bus 220. In one embodiment, the computing device 200 is a navigation server 101. In another embodiment, the computing device 200 is a client device 115. In yet another embodiment, the computing device 200 is a mobile computing system 135.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from the probability module 109. The communication unit 241 is coupled to the bus 220 via signal line 226. In some embodiments, the communication unit 241 includes a wireless transceiver for exchanging data with the other components in the computing device 200 or other communication channels using one or more wireless communication methods, including IEEE 802.11, IEEE 802.16, BLUETOOTH® or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 245 can be a non-transitory memory that stores data for providing the functionality described herein. The storage device 245 may be a dynamic random access memory (DRAM) device, a static random access memory (SRAM) device, flash memory or some other memory devices. In some embodiments, the storage device 245 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 245 is communicatively coupled to the bus 220 via signal line 228. In one embodiment, the storage device 245 includes route data, map data and journey factors of users 125. For example, the journey factors can include, but not limited to, a day of the week, a time of the day, the weather of the day, whether the day is a national holiday, whether it is raining during the day, what the starting point of the journey is, what the destination point of the journey is, what the stopping points along the journey are, an elapsed distance, an elapsed journey time, etc. The storage device 245 can also include intersection probability models including maneuver ratios at intersections. In some embodiments, the storage device 245 may store other data for providing the functionality described herein. In some embodiments, the storage device 245 can be one of the storage 143, storage 144 and storage 145 depending on where the probability module 109 is stored.

In the illustrated embodiment shown in FIG. 2, the probability module 109 includes a communication module 202, a route module 204, an intersection extractor 206, a modeling module 208, an estimation module 210 and a user interface module 212. The components of the probability module 109 are communicatively coupled via the bus 220.

The communication module 202 can be software including routines for handling communications between the probability module 109 and other components of the computing device 200. In one embodiment, the communication module 202 can be a set of instructions executable by the processor 235 to provide the functionality described below for handling communications between the probability module 109 and other components of the computing device 200. In another embodiment, the communication module 202 can be stored in the memory 237 of the computing device 200 and can be accessible and executable by the processor 235. In either embodiment, the communication module 202 can be adapted for cooperation and communication with the processor 235 and other components of the computing device 200.

In some embodiments, the communication module 202 receives map data describing a map from the data server 120. For example, the communication module 202 is instructed by the route module 204 to send a request for a map to the data server 120 and receive the requested map from the data server 120. In some embodiments, the communication module 202 is instructed by the route module 204 to retrieve route data describing historical routes traveled by users 125 from the data server 120. For example, the route data can be Global Positioning System ("GPS") data describing routes traveled by users 125 during a certain period of time and in a certain area. The communication module 202 sends the map data and/or route data to the route module 204.

In some embodiments, the communication module 202 receives estimated most likely route that a user 125 may take from the estimation module 210. The communication module 202 may also receive useful information associated with the most likely route from the estimation module 210. For example, the useful information can include map information for the most likely route, attraction information for the most likely route, traffic information associated with the most likely route, etc. In some embodiments, the communication module 202 delivers the most likely route and useful information associated with the most likely route to the user interface module 212 that generates a user interface displaying the route and useful information associated with the route to the user 125. In some embodiments, the communication module 202 delivers the user interface to the mobile computing system 135 or the client device 115 that shows the user interface including the route and useful information associated with the route to the user 125.

The route module 204 can be software including routines for requesting map data and route data from the data server 120. In one embodiment, the route module 204 can be a set of instructions executable by the processor 235 to provide the functionality described below for requesting map data and route data from the data server 120. In another embodiment, the route module 204 can be stored in the memory 237 of the computing device 200 and can be accessible and executable by the processor 235. In either embodiment, the route module 204 can be adapted for cooperation and communication with the processor 235 and other components of the computing device 200.

In some embodiments, the route module 204 generates a request for a map and sends the request for the map to the data server 120 via the communication module 202. In some embodiments, the route module 204 generates a request for historical routes traveled by users 125 and sends the request for historical routes to the data server 120 via the communication module 202. In some embodiments, the map can be associated with the historical routes traveled by users 125. For example, the route module 204 generates a request for a map covering "San Jose" area in "California." The map can include multiple freeways and intersections in "San Jose." The route module 204 also generates a request for historical routes traveled by users 125 in "San Jose, Calif." during the last three months, e.g., from January to March. For example, the historical routes traveled by users 125 can be GPS data describing historical routes collected by the data server 120 from the users 125 and stored in the route storage 129. The route module 204 receives the map data and route data from the data server 120 via the communication module 202.

In some embodiments, the route module 204 matches the historical routes to the map. For example, the map describes "San Jose, Calif." The route data includes 123,456,789,001 routes that users 125 have traveled in "San Jose, Calif." during last six months. The route module 204 matches the 123,456,789,001 (one hundred and twenty-three billion, four hundred and fifty-six million, seven hundred and eighty-nine thousand and one) routes traveled by users 125 in "San Jose, Calif." to the map.

In some embodiments, the route module 204 sends map data describing a map and route data describing historical routes traveled by users 125 to the intersection extractor 206. In some embodiments, the route module 204 stores map data describing a map and route data describing historical routes traveled by users 125 in the storage 245.

The intersection extractor 206 can be software including routines for extracting intersections associated with historical routes. In one embodiment, the intersection extractor 206 can be a set of instructions executable by the processor 235 to provide the functionality described below for extracting intersections associated with historical routes. In another embodiment, the intersection extractor 206 can be stored in the memory 237 of the computing device 200 and can be accessible and executable by the processor 235. In either embodiment, the intersection extractor 206 can be adapted for cooperation and communication with the processor 235 and other components of the computing device 200.

In some embodiments, the intersection extractor 206 receives map data describing a map and route data describing historical routes traveled by users 125 from the route module 204. For example, the intersection extractor 206 receives, from the route module 204, a map that describes the area of "San Jose, Calif." The intersection extractor 206 also receives the route data that includes 123,456,789,001 historical routes that users 125 have traveled in "San Jose, Calif." during last six months. For example, the 123,456,789,001 historical routes are matched to the map for "San Jose, Calif." In some embodiments, the intersection extractor 206 is instructed by the modeling module 208 to identify intersections on the historical routes passed by users 125 based on the map. For example, the intersection extractor 206 identifies 10 intersections along a freeway traveled by users 125. In some embodiments, the intersection extractor 206 generates an intersection list including identified intersections associated with the historical routes.

In some embodiments, routes can split through an intersection since users 125 may choose an option of a left turn, a right turn, going straight or sometimes a U-turn at the intersection depending on the destinations of the users 125 or attractions along the road. For example, users 125 may make a right turn at one intersection because there is a school or a restaurant on the right side. Therefore, splits of routes at intersections construct an very important factor when building a probability model, which can later be used to determine potential routes for future users 125 passing the intersections. In some embodiments, the intersection extractor 206 sends an intersection list including identified intersections associated with historical routes to the modeling module 208 for building an intersection probability model. In some embodiments, the intersection extractor 206 stores an intersection list including intersections associated with historical routes in the storage 245.

In some embodiments, the intersection extractor 206 is instructed by the estimation module 210 to identify one or more intersections associated with a position of a user 125 on a map. For example, the estimation module 210 determines that a user 125 is on a freeway. The intersection extractor 206 is controlled by the estimation module 210 to identify a first intersection on the freeway next to the user 125. The intersection extractor 206 may also be instructed by the estimation module 210 to determine a second intersection next to the first intersection based on a maneuver (e.g., a left turn, a right turn, going straight or a U-turn) taken by the user 125 at the first intersection.

The modeling module 208 can be software including routines for generating an intersection probability model describing maneuver ratios at intersections. In one embodiment, the modeling module 208 can be a set of instructions executable by the processor 235 to provide the functionality described below for generating an intersection probability model describing maneuver ratios at intersections. In another embodiment, the modeling module 208 can be stored in the memory 237 of the computing device 200 and can be accessible and executable by the processor 235. In either embodiment, the modeling module 208 can be adapted for cooperation and communication with the processor 235 and other components of the computing device 200.

In some embodiments, the modeling module 208 determines a maneuver ratio at an intersection based on the historical routes traveled by users 125. In some embodiments, the modeling module 208 receives an intersection list from the intersection extractor 206 and identifies an intersection from the list. The modeling module 208 analyzes historical routes through the intersection and calculates a ratio of each possible maneuver based on the historical routes. In some embodiments, a maneuver at an intersection includes a left turn, a right turn, going straight and a U-turn. The modeling module 208 determines how many routes turn left at the intersection, how many routes turn right, how many routes go straight and how many routes make a U-turn at the intersection. In some embodiments, the modeling module 208 also determines how many historical routes traveled through the intersection in total. For example, the modeling module 208 calculates the total number of routes corresponding to all kinds of maneuvers at the intersection. In some embodiments, the modeling module 208 calculates a ratio of each kind of maneuver at the intersection based on the numbers of the routes. For example, the modeling module 208 calculates a ratio of a left turn at the intersection by dividing the number of routes turning left at the intersection by the total number of routes. In another example, the modeling module 208 calculates a ratio of going straight at the intersection by dividing the number of routes going straight forward by the total number of routes.

In some embodiment, the modeling module 208 generates the intersection probability model also based on one or more journey factors. For example, the modeling module 208 calculates a ratio of a maneuver at an intersection based on whether the day is a national holiday or not. Examples for the journey factors can include, but not limited to, a day of the week, a time of the day, the weather of the day, whether the day is a national holiday, whether it is raining during the day, what the starting point of the journey is, what the destination point of the journey is, what the stopping points along the journey are, etc. Other journey factors can include an elapsed distance of the journey, an elapsed time of the journey, whether the users 125 started before an intersection, how far it is between the starting point of the users 125 and the intersection, how many intervening intersections between the starting point of the user 125 and the current intersection, etc. For example, an elapsed distance of the journey can be measured by the distance the user 125 has traveled along the route, e.g., by measuring how many miles (e.g., 20 miles) the user 125 has traveled. In another example, an elapsed distance of the journey can be measured by how much percent of the user journey has elapsed, e.g., 20%, 50%, 90%, etc. Similarly, for example, an elapsed time of the journey can be measured by the time during which the user 125 has traveled through the route (e.g., 30 minutes). In another example, an elapsed time of journey can also be measure by how much percent of time has elapsed during the journey.

In some embodiments, the modeling module 208 retrieves historical routes traveled by users 125 that are characterized by one or more of the journey factors and determines a maneuver ratio at an intersection based on the historical routes characterized by the one or more journey factors. For example, the modeling module 208 retrieves historical routes traveled by users 125 only on weekdays and calculates a ratio of a maneuver (e.g., a left turn) at an intersection for weekdays based on the number of routes on weekdays corresponding to the maneuver (e.g., a left turn) and the number of total routes on weekdays. In another example, the modeling module 208 calculates a ratio of a maneuver (e.g., a right turn) at an intersection for raining days by dividing the number of routes during raining days corresponding to the maneuver (e.g., a right turn) by the number of the total routes during rainy days. In some examples, the modeling module 208 determines a maneuver ratio at an intersection located at second half of journeys based on the numbers of historical routes with the intersection located where users 125 has traveled more than 50% of the routes. In some other examples, the modeling module 208 determines a maneuver ratio at an intersection passed by users 125 when less than 50% of journey time has elapsed. The modeling module 208 determines the maneuver ratio at the intersection based on the numbers of historical routes on which the users 125 passed the intersection during the first half of journey time.

In some embodiments, the modeling module 208 determines ratios of maneuvers for an intersection corresponding to more than one journey factors. For example, the modeling module 208 determines ratios of maneuvers at an intersection for rainy weekends. In another example, the modeling module 208 determines ratios of maneuvers at an intersection for lunch hours during weekdays. In yet another example, the modeling module 208 determines ratios of maneuvers for an intersection corresponding to journeys starting from downtown "San Francisco" and stopping at "Ocean Beach" in the middle of the journeys.

In some embodiments, the modeling module 208 determines ratios of maneuvers at intersections included in the intersection list and generates an intersection probability model describing the ratios of maneuvers at intersections in the list. In some embodiments, the modeling module 208 generates intersection probability models corresponding to different journey factors. In some embodiments, the modeling module 208 stores the intersection probability models in the storage 245.

In some embodiments, the modeling module 208 may also determines likelihoods for users 125 stopping at certain locations based on the historical routes traveled by users 125. In some embodiments, the modeling module 208 generates a probabilistic graph including the ratios of maneuvers at intersections. For example, the modeling module 208 instructs the user interface module 212 to generate a probabilistic graph describing ratios of maneuvers that users 125 have taken historically at intersections located in an area, e.g., "San Francisco." In some embodiments, the probabilistic graph also includes other information retrieved from journey logs for users 125. The probabilistic graph can then be used to disseminate relevant information to users 125 that might traverse the same graph in the future.

The estimation module 210 can be software including routines for estimating a most likely route for a user 125. In one embodiment, the estimation module 210 can be a set of instructions executable by the processor 235 to provide the functionality described below for estimating a most likely route for a user 125. In another embodiment, the estimation module 210 can be stored in the memory 237 of the computing device 200 and can be accessible and executable by the processor 235. In either embodiment, the estimation module 210 can be adapted for cooperation and communication with the processor 235 and other components of the computing device 200.

In some embodiments, the estimation module 210 receives position data describing a position of a user 125 from a client device 115 or a mobile computing system 135. For example, the estimation module 210 receives position data indicating that a user 125 is on a freeway across "San Francisco." In some embodiments, the estimation module 210 retrieves an intersection probability model including ratios of maneuvers at intersections in the area where the user 125 is. For example, the estimation module 210 retrieves, from the storage 245, the intersection probability model for "San Francisco" including maneuver ratios for intersections along the freeway where the user 125 is. In some embodiments, the estimation module 210 estimates a most likely route for the user 125 based on the intersection probability model. For example, the estimation module 210 determines a most likely maneuver that the user 125 may take at each intersection so that a most likely route can be determined.

In some embodiments, the estimation module 210 assumes a starting point for the user 125. For example, the estimation module 210 assumes that the user 125 turned onto a freeway from a certain intersection behind the current position of the user 125. In some embodiments, the estimation module 210 identifies an intersection based on the position of the user 125 and determines a most likely maneuver that the user 125 may take at the intersection. For example, the estimation module 210 identifies a first intersection ahead of the user 125 along the freeway. The estimation module 210 determines probabilities of all possible maneuvers the user 125 may make at the first intersection based on the intersection probability model. For example, based on the model, the estimation module 210 determines that the probabilities of a left turn, a right turn and going straight forward the user 125 may take at the first intersection are 20%, 30% and 50% respectively. For example, the probabilities of the maneuvers can be the ratios of the maneuvers based on the historical route data. The estimation module 210 then determines that the maneuver with the highest probability at the first intersection is going straight. Therefore, the estimation module 210 determines that the user 125 will most likely go straight forward at the first intersection.

In some embodiments, the estimation module 210 identifies the second intersection based on the most likely maneuver of the user 125 at the first intersection, determines a most likely maneuver of the user 125 at the second intersection and repeats the process until a most likely destination is reached. For example, responsive to determining that the user 125 will most likely go straight along the freeway at the first intersection, the estimation model 210 identifies the next intersection ahead. The estimation module 210 determines probabilities of all possible maneuvers the user 125 may take at the next intersection and determines a maneuver with the highest probability as the most likely maneuver the user 125 may take at the next intersection. By determining the most likely maneuver at the second intersection, the estimation module 210 can determines another next intersection along the route. The estimation module 210 repeats the process of determining the most likely maneuver at each intersection until reaches a destination for the user 125. Accordingly, the estimation module 210 determines a most likely route for the user 125. In some embodiments, the estimation module 210 can also determines potential stopping points along the most likely route for the user 125.

In some embodiments, during the process of determining the most likely maneuver at each intersection, the estimation model 210 also determines journey factors having an effect on the probabilities of maneuvers the user 125 may take at each intersection. For example, the estimation module 210 determines that the day is Monday and the day is not a national holiday. The estimation module 210 retrieves ratios of maneuvers at the first intersection on Monday which is not a national holiday and determines the most likely maneuver of the user 125 based on these ratios. In some embodiments, the estimation module 210 anticipates a time when the user 125 may arrive at the next intersection and determines ratios of maneuvers based on the time. In some embodiments, the estimation module 210 estimates an elapsed distance of the user's 125 journey and/or an elapsed time of the user's 125 journey and determines ratios of maneuvers at each intersection by also applying these journey factors.

In some embodiments, the estimation module 210 also determines useful information associated with the most likely route of the user 125. For example, the estimation module 210 determines map information and route information of the most likely route for the user 125. In another example, the estimation module 210 also determines information about attractions, amenities, incidents, etc., associated with the most likely route for the user 125. In yet another example, the estimation module 210 also determines traffic information associated with the most likely route for the user 125, e.g., traffic delays, road closures, etc.

The user interface module 212 can be software including routines for generating a user interface for displaying useful information of a route for a user 125. In one embodiment, the user interface module 212 can be a set of instructions executable by the processor 235 to provide the functionality described below for generating a user interface for displaying useful information of a route for a user 125. In another embodiment, the user interface module 212 can be stored in the memory 237 of the computing device 200 and can be accessible and executable by the processor 235. In either embodiment, the user interface module 212 can be adapted for cooperation and communication with the processor 235 and other components of the computing device 200.

In some embodiments, the user interface module 212 receives instructions from the estimation module 210 to generate a user interface for displaying useful information associated with the anticipated most likely route for the user 125. For example, the useful information includes attractions and amenities along the potential route the user 125 may most likely travel. In another example, the useful information also includes traffic delay information and road closure information associated with the most likely route. In some embodiments, the user interface module 212 transmits the user interface data including the useful information to a client device 115 or a mobile computing system 135, causing the client device 115 or the mobile computing system 135 to display the user interface including useful information to the user 125.

Methods

Figure 3:
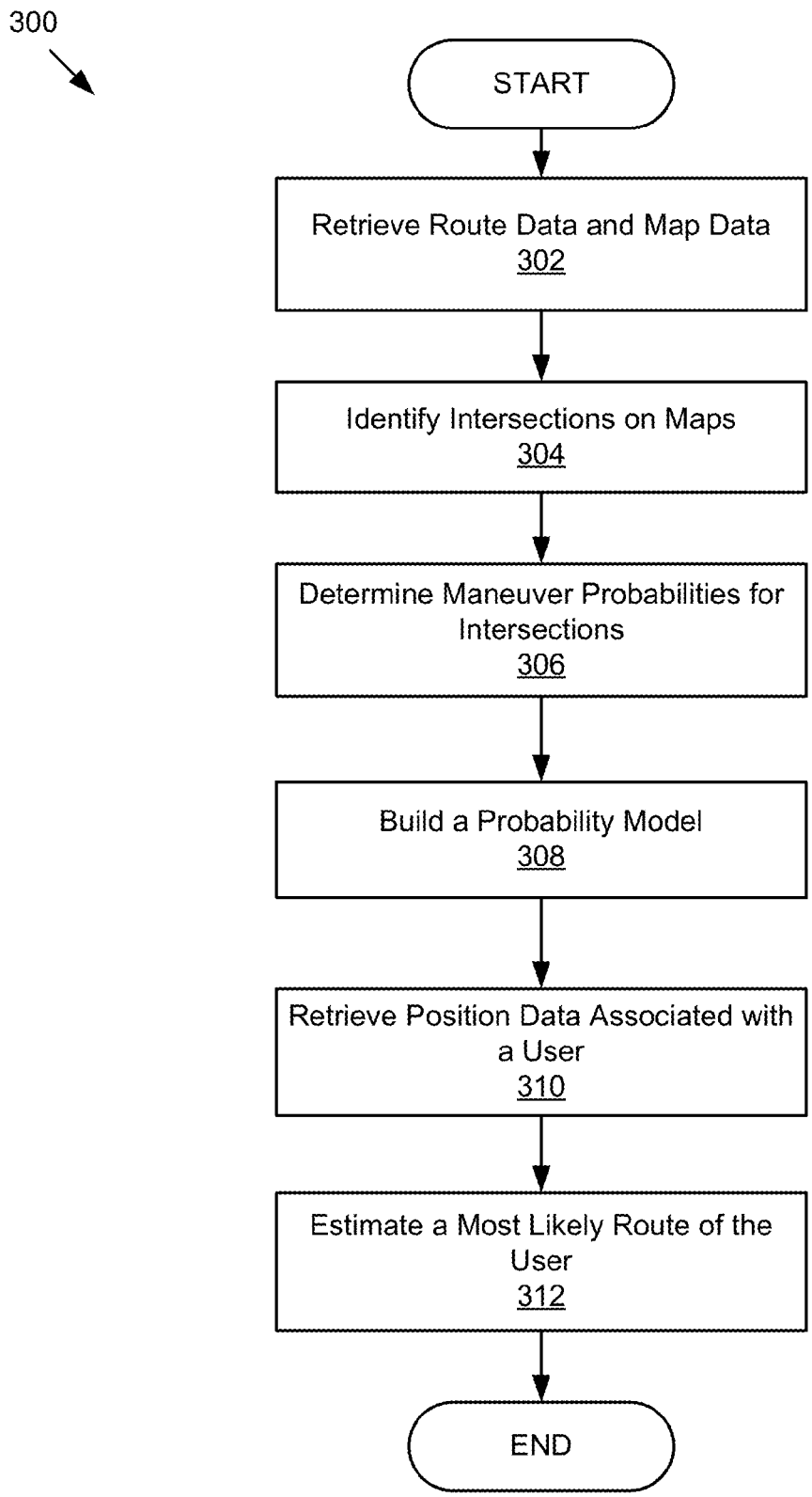
FIG. 3 is a flow diagram of one embodiment of a method for estimating a most likely route for a user.

FIG. 3 is a flow diagram of one embodiment of a method 300 for estimating a most likely route for a user 125. In the illustrated embodiment, the method 300 can include retrieving 302 route data and map data. For example, the route module 204 requests route data describing historical routes traveled by users 125 and map data describing one or more maps from the data server 120 via the communication module 202. The method 300 can also include identifying 304 intersections on one or more maps. For example, the intersection extractor 206 identifies intersections associated with the historical routes on the one or more maps. The method 300 can include determining 306 maneuver ratios for intersections. For example, the modeling module 208 determines ratios of all possible maneuvers at intersections identified on the one or more maps based on the historical routes traveled by users 125. The method 300 can also include building 308 a probability model. For example, the modeling module 208 builds an intersection probability model describing ratios of maneuvers that users 126 have taken at intersections. The method 300 can include retrieving 310 position data associated with a user 125. For example, the estimation module 210 retrieves position data indicating a position of a user 125 from an appropriate device or system, e.g., a client device 115 or a mobile computing system 135. The method 300 can also include estimating 312 a most likely route of the user 125. For example, the estimation module 210 estimates a most likely route of the user 125 based on the position of the user 125 and the intersection probability model.

Figure 4:
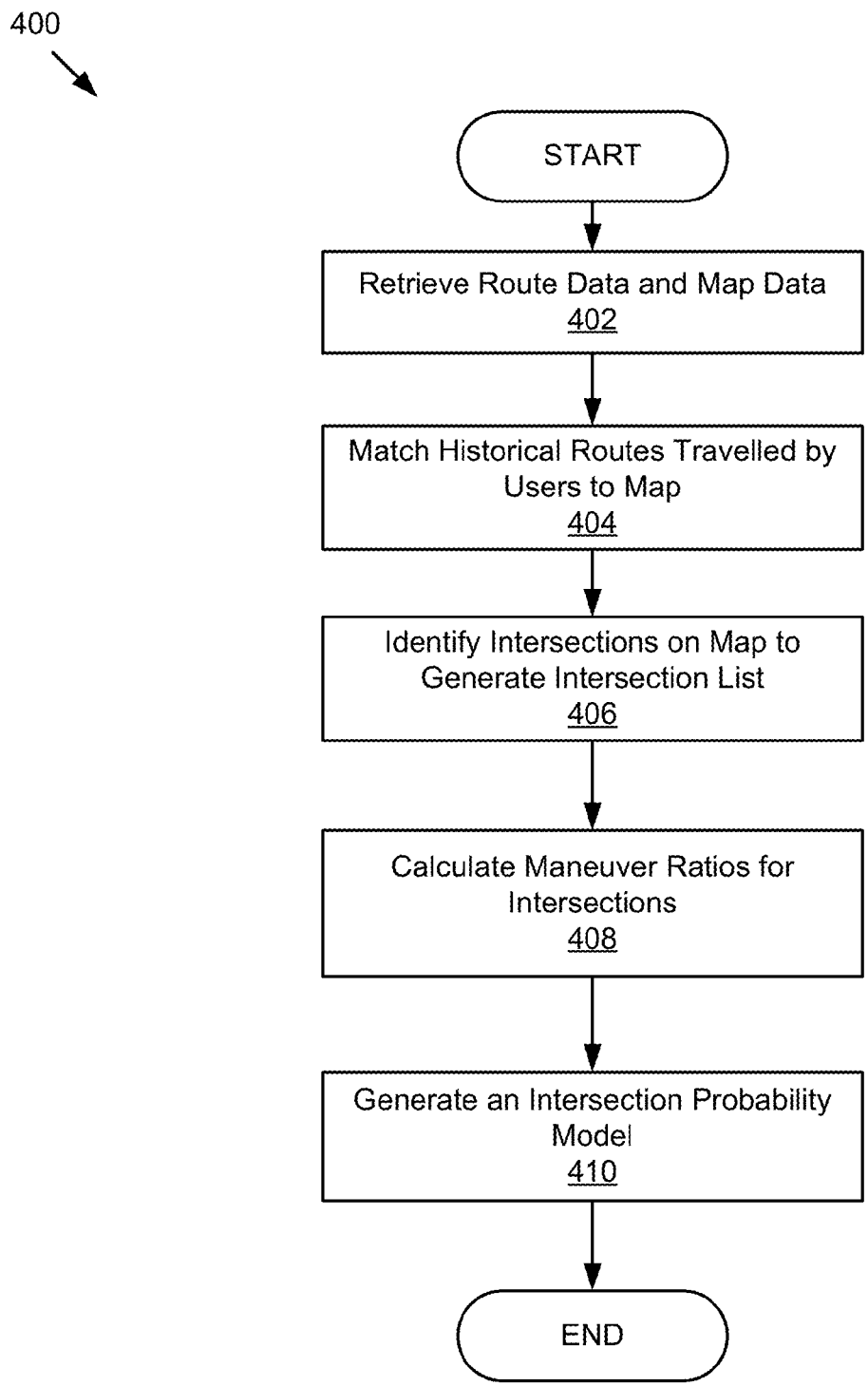
FIG. 4 is a flow diagram of one embodiment of a method for generating a probability model.

FIG. 4 is a flow diagram of one embodiment of a method 400 for generating a probability model. In the illustrated embodiment, the method 400 can include retrieving 402 route data and map data. For example, the route module 204 requests route data describing historical routes traveled by users 125 and map data describing a map from the data server 120 via the communication module 202. The method 400 can also include matching 404 historical routes traveled by users 125 to a map. For example, the route module 204 matches the historical routes traveled by users 125 to the map. The method 400 can include identifying 406 intersections on the map to generate an intersection list. For example, the intersection extractor 206 identifies intersections associated with the historical routes on the map and generates an intersection list including the intersections on the map. The method 400 can also include calculating 408 maneuver ratios for intersections. For example, the modeling module 208 calculates ratios for all possible maneuvers (e.g., a left turn, a right turn, going straight, a U-turn, etc.) for an intersection based on the historical routes traveled by users 125. The modeling module 208 calculates ratios for maneuvers at intersections included in the intersection list. The method 400 can include generating 410 an intersection probability model. For example, the modeling module 208 generates an intersection probability model describing ratios of maneuvers at intersections.

Figure 5:
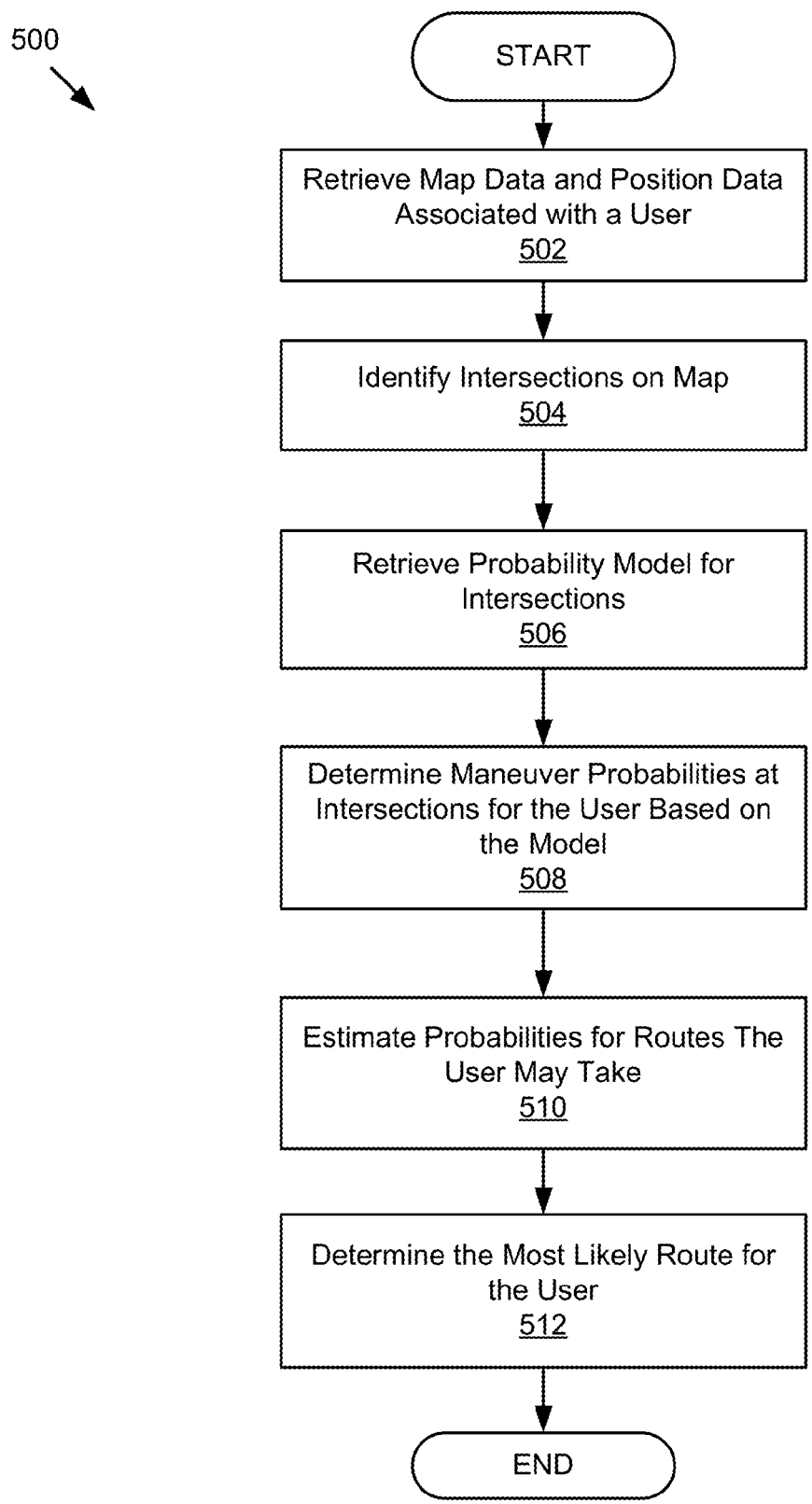
FIG. 5 is a flow diagram of another embodiment of a method for estimating a most likely route for a user.

FIG. 5 is a flow diagram of another embodiment of a method 500 for estimating a most likely route for a user 125. In the illustrated embodiment, the method 500 can include retrieving 502 map data and position data associated with a user 125. For example, the estimation module 210 retrieves position data indicating a position of a user 125. The estimation module 210 can also retrieve a map covering the position of the user 125. The method 500 can also include identifying 504 intersections on a map. For example, the estimation module 210 instructs the intersection extractor 206 to identify one or more intersections associated with the position of the user 125. For example, if the user 125 is on a freeway, the intersection extractor 206 may identify intersections along the freeway and ahead of the position of the user 125. The method 500 can include retrieving 506 a probability model for intersections. For example, the estimation module 210 retrieves a probability model including ratios of all possible maneuvers (e.g. a left turn, a right turn, going straight, a U-turn, etc.) at each of the intersections. For example, the intersection probability model is built according to the above-described method 400.

The method 500 can also include determining 508 maneuver probabilities at intersections for the user 125 based on the model. For example, the estimation module 210 determines, based on the maneuver ratios at intersections described by the probability model, a probability of the user 125 taking each of the all possible maneuvers (e.g. a left turn, a right turn, going straight, a U-turn, etc.) at each intersection. For example, the estimation module 210 determines the user 125 may make a left turn at a 20% chance, make a right turn at a 30% chance, go straight at a 45% chance and make a U-turn at a 5% chance. The determining 508 of maneuver probabilities at intersections for the user 125 based on the model will be described in further detail with reference to FIG. 6. The method 500 can also include estimating 510 probabilities for routes that the user 125 may take. For example, based on the maneuver probabilities at intersections, the estimation module 210 determines one or more possible routes that the user 125 may take and estimates a probability of the user 125 taking each of the one or more routes. The method 500 can include determining 512 the most likely route for the user 125. For example, the estimation module 210 determines the route with the highest probability of being taken by the user 125 as the most likely route.

Figure 6:
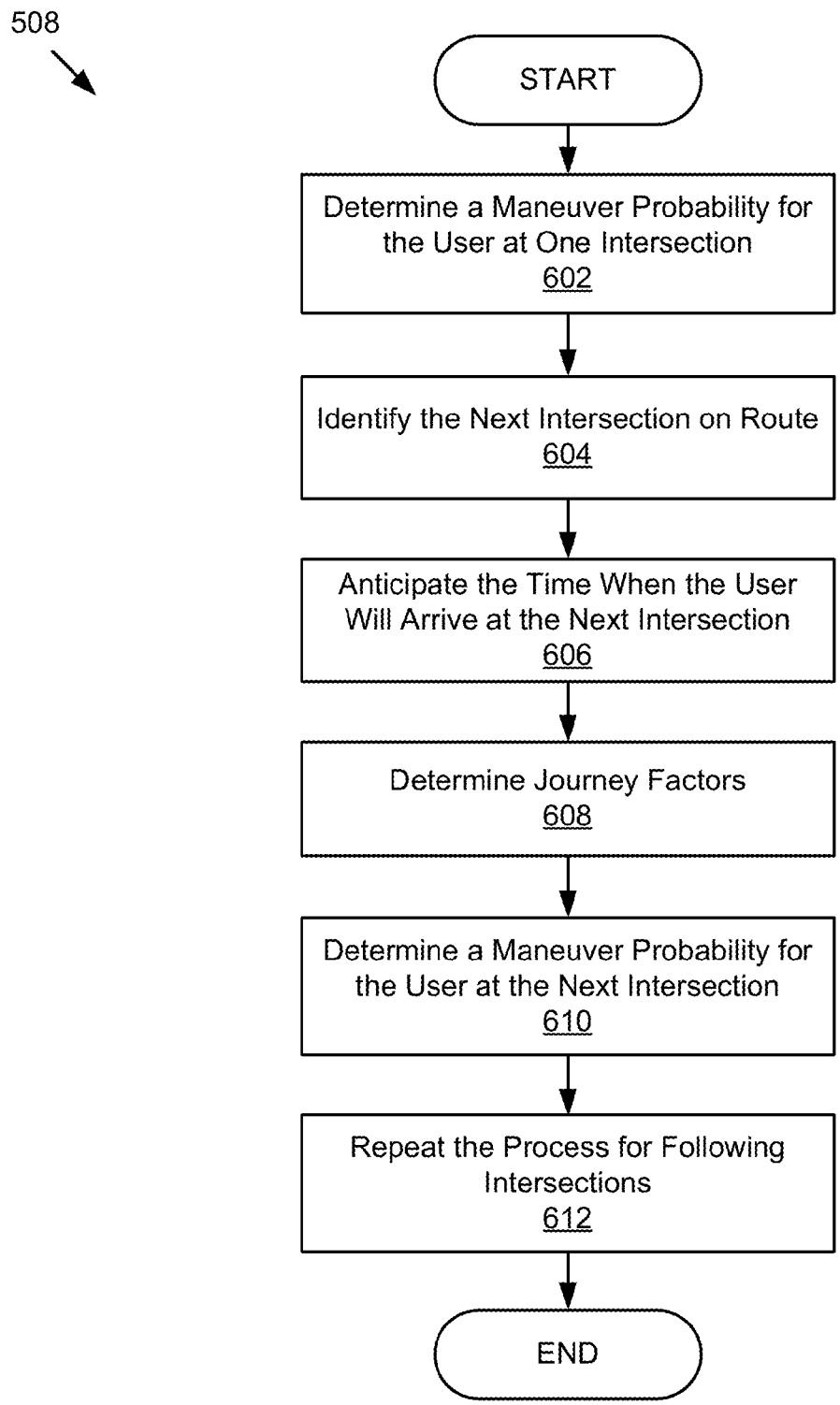
FIG. 6 is a flow diagram of one embodiment of a method for calculating maneuver probabilities for intersections.

FIG. 6 is a flow diagram of one embodiment of a method 600 for calculating maneuver probabilities for intersections. In the illustrated embodiment, the method 600 can include determining 602 a maneuver probability for the user 125 at one intersection. For example, the estimation module 210 instructs the intersection extractor 206 to identify a first intersection associated with the position of the user 125. The estimation module 210 determines a probability for each possible maneuver at the first intersection. For example, the estimation module 210 determines that the user 125 may take a left turn at a 20% chance, make a right turn at a 30% chance, go straight at a 45% chance and make a U-turn at a 5% chance. Therefore, the estimation module 210 determines that the user 125 will most likely go straight at the first intersection since the user 125 may go straight with the largest chance. The method 600 can also include identifying 604 the next intersection on route. For example, the estimation module 210 instructs the intersection extractor 206 to identify the next intersection based on the most likely maneuver taken by the user 125 at the first intersection. For example, if the user 125 is determined to most likely go straight on a freeway at the first intersection, the estimation module 210 determines the intersection ahead along the freeway as the next intersection. The method 600 can include anticipating 606 the time when the user 125 will arrive at the next intersection. For example, the estimation module 210 anticipates when the user 125 will arrive at the next intersection based on the position and velocity of the user 125 and the location of the next intersection. The method 600 can also include determining 608 journey factors. For example, the estimation module 210 estimates a starting point for the user 125 and determines journey factors including an elapsed distance of the journey and an elapsed time of the journey. In another example, the estimation module 210 determines other journey factors including the day of the week, the time of the day, the weather of the day, whether it is a national holiday, etc. The method 600 can include determining 610 a maneuver probability for the user 125 at the next intersection. For example, the estimation module 210 determines a probability of each possible maneuver at the next intersection based on the journey factors. The estimation module 210 may also determines a most likely maneuver (e.g., a right turn) for the user 125 at the second intersection. The method 600 can also include repeating 612 the process for following intersections. For example, the estimation module 210 determines, based on the most likely maneuver at the second intersection, a third intersection along the route and determines maneuver probabilities at the third intersection. The estimation module 210 may repeat the process for the following intersections until a destination is reached.

Example Graphical Representations

Referring now to FIGS. 7A-7D, embodiments of routes between freeway intersections on a map are illustrated.

Figure 7A:
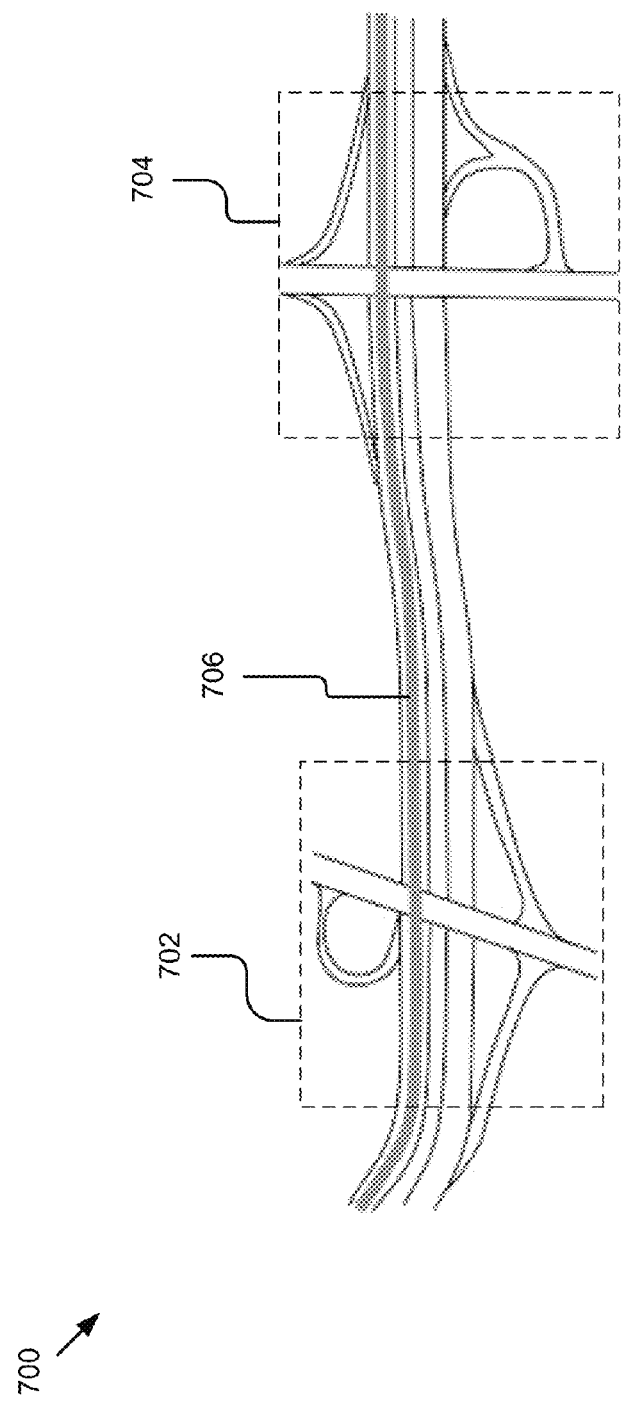
FIG. 7A is a graphic representation illustrating one embodiment of a route between freeway intersections on a map.

FIG. 7A is a graphic representation 700 illustrating one embodiment of a route between freeway intersections on a map. In the illustrated embodiment, elements 702, 704 are graphical representations of two intersections along a freeway. Element 706 is a graphical representation of a route traveled by one or more users 125 between the two freeway intersections 702, 704. For example, the route 706 indicates that the one or more users 125 go straight through both of the intersections 702, 704.

Figure 7B:
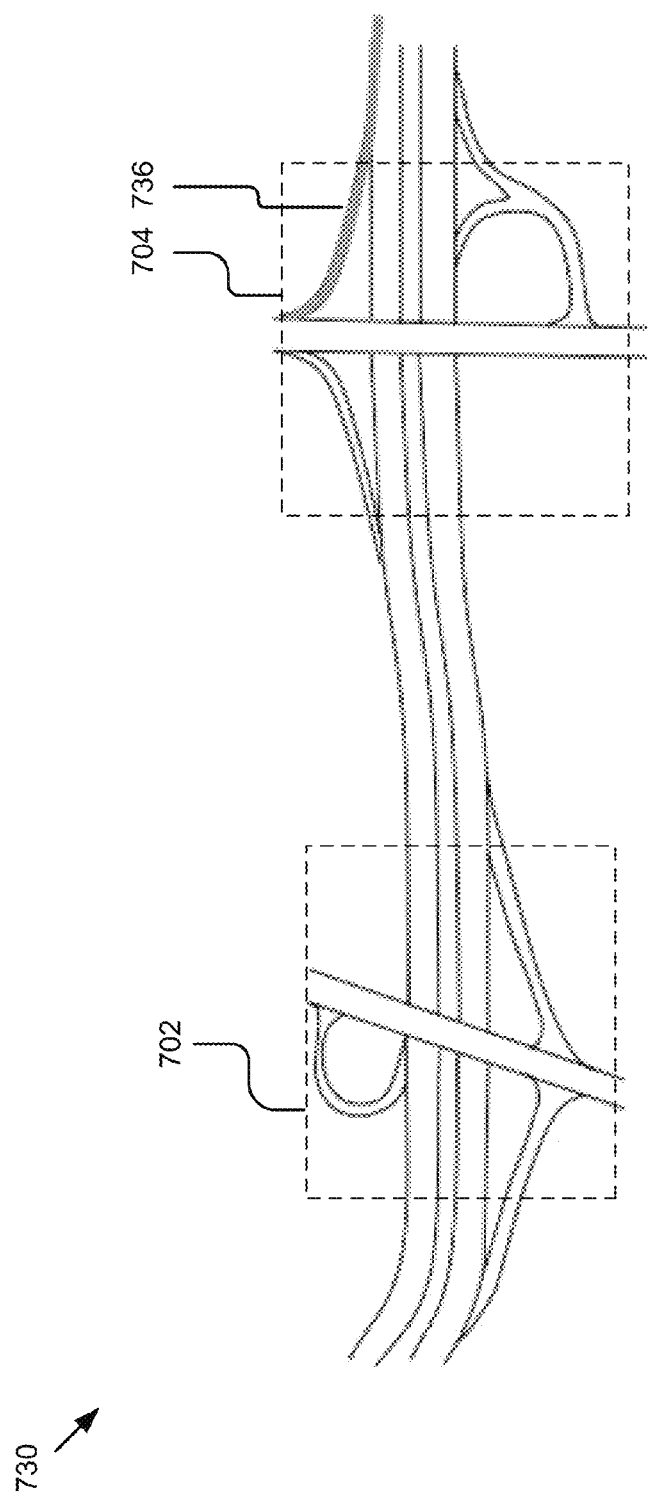
FIG. 7B is a graphic representation illustrating one embodiment of a route between freeway intersections on a map.

FIG. 7B is a graphic representation 730 illustrating one embodiment of a route between freeway intersections on a map. In the illustrated embodiment, elements 702, 704 are graphical representations of two intersections along a freeway. Element 736 is a graphical representation of a route traveled by one or more users 125 between the two freeway intersections 702, 704. For example, the route 736 indicates that the one or more users 125 exit from the freeway at the intersection 702.

Figure 7C:
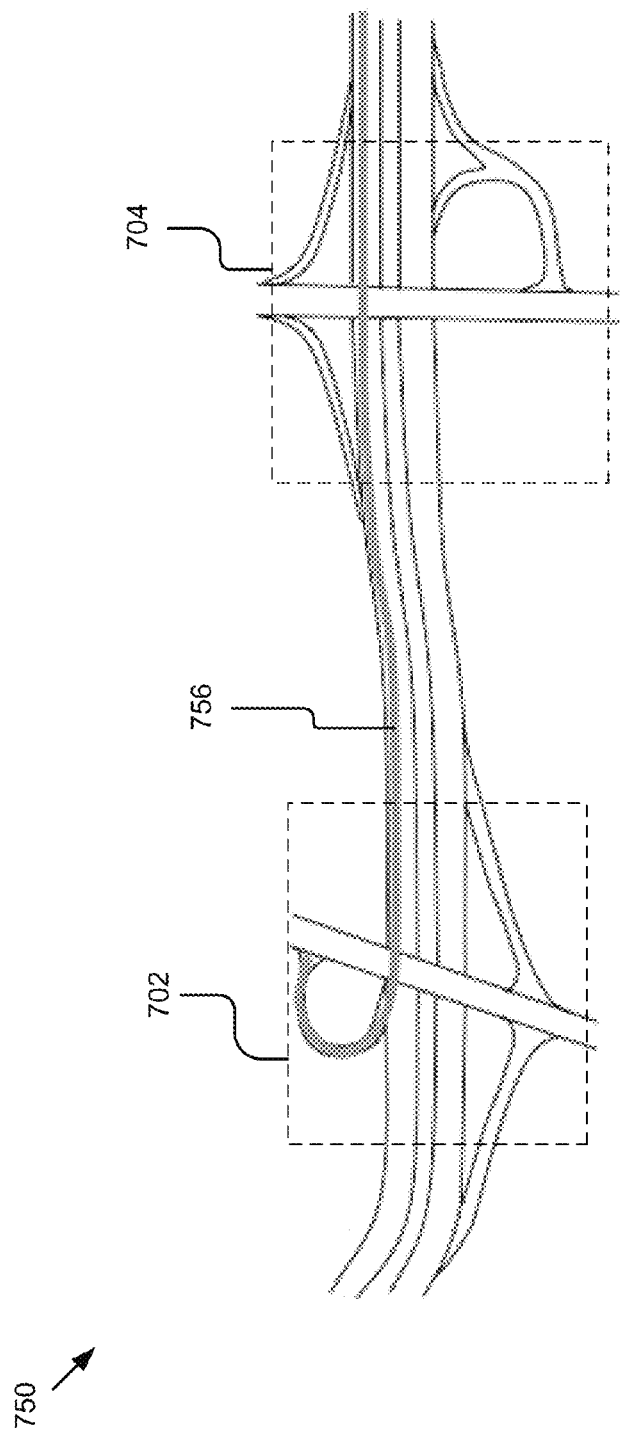
FIG. 7C is a graphic representation illustrating one embodiment of a route between freeway intersections on a map.

FIG. 7C is a graphic representation 750 illustrating one embodiment of a route between freeway intersections on a map. In the illustrated embodiment, elements 702, 704 are graphical representations of two intersections along a freeway. Element 756 is a graphical representation of a route traveled by one or more users 125 between the two freeway intersections 702, 704. For example, the route 756 indicates that the one or more users 125 exit from the freeway at the intersection 704.

Figure 7D:
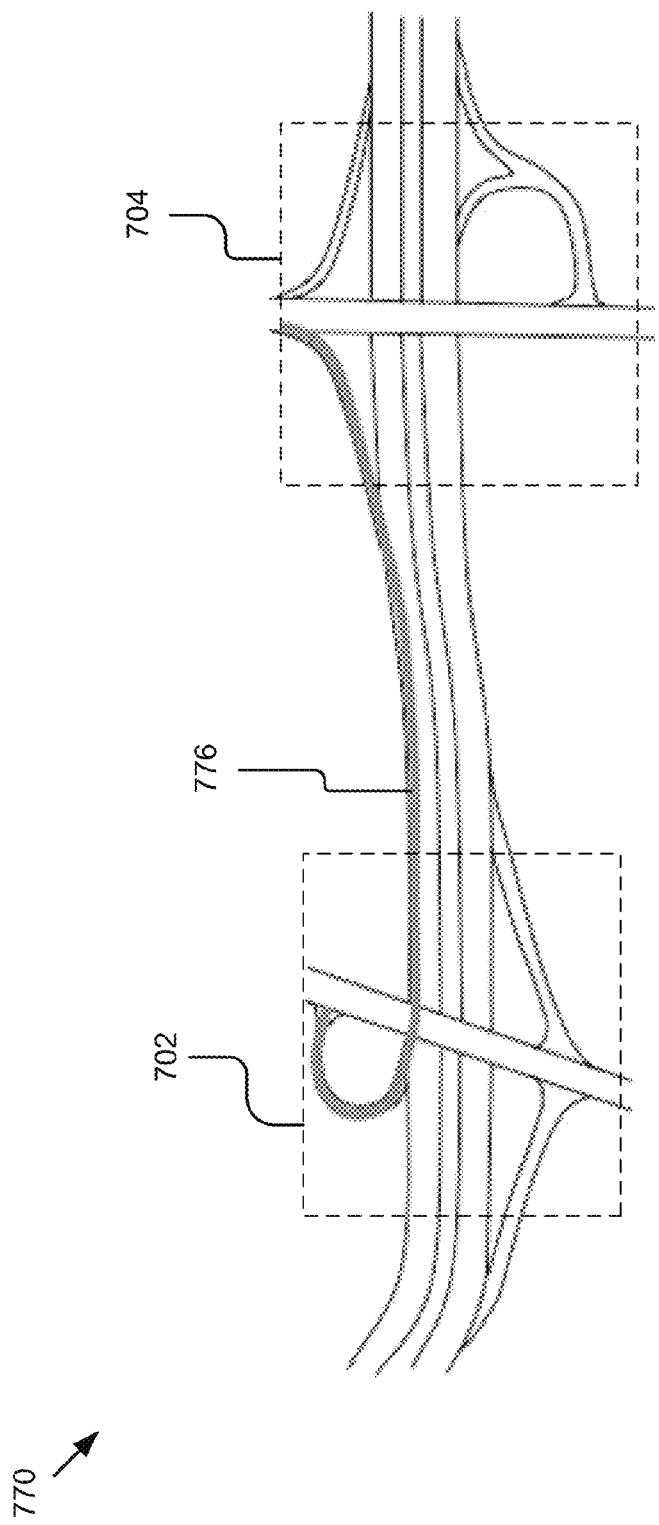
FIG. 7D is a graphic representation illustrating one embodiment of a route between freeway intersections on a map.

FIG. 7D is a graphic representation 770 illustrating one embodiment of a route between freeway intersections on a map. In the illustrated embodiment, elements 702, 704 are graphical representations of two intersections along a freeway. Element 776 is a graphical representation of a route traveled by one or more users 125 between the two freeway intersections 702, 704. For example, the route 776 indicates that the one or more users 125 get onto the freeway at the intersection 702 and get off the freeway at the intersection 704.

Figure 8:
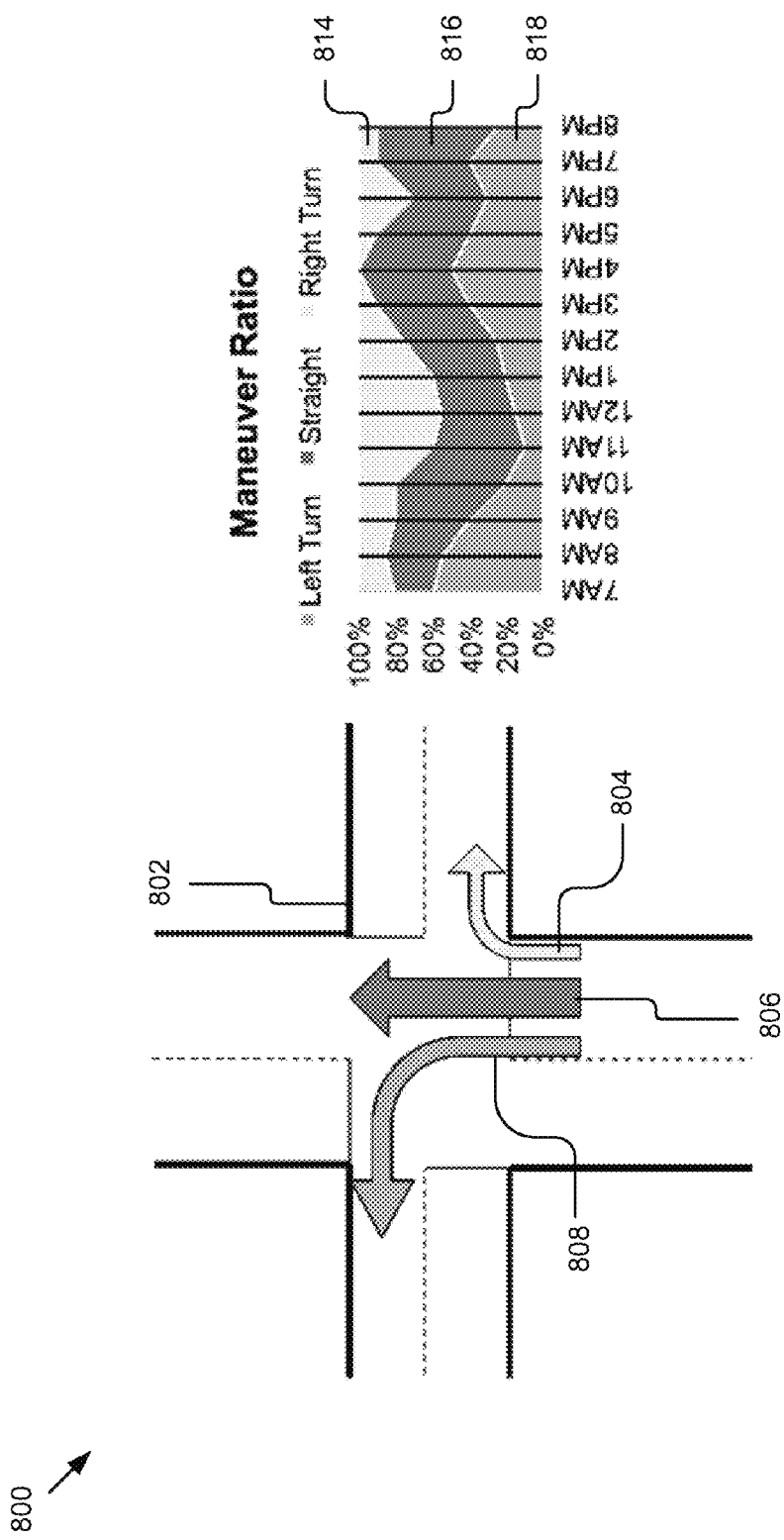
FIG. 8 is a graphic representation illustrating one embodiment of different maneuver ratios at one intersection.

FIG. 8 is a graphic representation 800 illustrating one embodiment of different maneuver ratios at one intersection. In the illustrated embodiment, element 802 is a graphical representation of an intersection. Elements 804, 806, 808 are graphical representations of maneuvers that a user 125 may take at the intersection 802. For example, the maneuver 804 is a right turn. The maneuver 806 is going straight forward. The maneuver 808 is a left turn. Elements 814, 816, 818 are graphical representations of maneuver ratios for the three maneuvers 804, 806, 808 at different times during a day.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    retrieving, with one or more processors, route data describing historical routes traveled by a group of first users and map data describing a map;
    matching, with the one or more processors, the historical routes to the map;
    identifying, with the one or more processors, one or more intersections associated with the historical routes on the map;
    determining, with the one or more processors, a maneuver ratio for one of the intersections based on the route data, the maneuver ratio describing a ratio of a maneuver that the group of first users has taken at the one of the intersections;
    generating, with the one or more processors, a probability model including one or more maneuver ratios for the one or more intersections;
    retrieving position data associated with a second user, the position data describing a position of the second user on the map;
    estimating probabilities for a set of routes that the second user may take based on the probability model;
    determining a most likely route for the second user from the set of routes based on the probabilities for the set of routes; and
    providing useful information associated with the most likely route for display to the second user.

2. The method of claim 1, wherein the maneuver includes one or more of a right turn, a left turn, a U-turn and going straight.

3. The method of claim 1, further comprising:
    determining one or more journey factors associated with the historical routes traveled by the group of first users and associated with the one or more intersections; and
    determining the probability model based on the one or more journey factors, the probability model corresponding to the one or more journey factors and generated based on the historical routes characterized by the one or more journey factors.

4. The method of claim 3, wherein the one or more journey factors include one or more of a day of a week, a time of a day, weather of a day, whether a day is a national holiday, whether rain is present during a day, what a starting point of one of the historical routes is, what a destination of one of the historical routes is, what a stopping point along one of the historical routes is, an elapsed distance of one of the historical routes and an elapsed time of one of the historical routes.

5. The method of claim 1, further comprising:
    identifying an intersection associated with the second user;
    calculating probabilities of maneuvers that the second user may take at the intersection based on the probability model; and
    determining a most likely maneuver that the second user may take at the intersection based on the probabilities of maneuvers.

6. The method of claim 1, further comprising:
    determining one or more journey factors associated with the second user; and
    calculating probabilities of maneuvers that the second user may take at the intersection based on the probability model and the one or more journey factors.

7. The method of claim 1, wherein the useful information associated with the most likely route includes information related to one or more of attractions, amenities, incidents, traffic delay, and road closure information along the most likely route.

8. A system comprising:
    one or more processors, the processors being configured to:
        retrieve route data describing historical routes traveled by a group of first users and map data describing a map;
        match the historical routes to the map;
        identify one or more intersections associated with the historical routes on the map;
        determine a maneuver ratio for one of the intersections based on the route data, the maneuver ratio describing a ratio of a maneuver that the group of first users has taken at the one of the intersections;

generate a probability model including one or more maneuver ratios for the one or more intersections;

retrieve position data associated with a second user, the position data describing a position of the second user on the map;

estimate probabilities for a set of routes that the second user may take based on the probability model;

determine a most likely route for the second user from the set of routes based on the probabilities for the set of routes; and provide useful information associated with the most likely route for display to the second user.

9. The system of claim 8, wherein the maneuver includes one or more of a right turn, a left turn, a U-turn and going straight.

10. The system of claim 8, wherein the processors are configured to also:

determine one or more journey factors associated with the historical routes traveled by the group of first users and associated with the one or more intersections; and determine the probability model based on the one or more journey factors, the probability model corresponding to the one or more journey factors and generated based on the historical routes characterized by the one or more journey factors.

11. The system of claim 10, wherein the one or more journey factors include one or more of a day of a week, a time of a day, weather of a day, whether a day is a national holiday, whether rain is present during a day, what a starting point of one of the historical routes is, what a destination of one of the historical routes is, what a stopping point along one of the historical routes is, an elapsed distance of one of the historical routes and an elapsed time of one of the historical routes.

12. The system of claim 8, wherein the processors are configured to also:

identify an intersection associated with the second user;

calculate probabilities of maneuvers that the second user may take at the intersection based on the probability model; and determine a most likely maneuver that the second user may take at the intersection based on the probabilities of maneuvers.

13. The system of claim 8, wherein the processors are configured to also:

determine one or more journey factors associated with the second user; and calculate probabilities of maneuvers that the second user may take at the intersection based on the probability model and the one or more journey factors.

14. The system of claim 8, wherein the useful information associated with the most likely route includes information related to one or more of attractions, amenities, incidents, traffic delay, and road closure information along the most likely route.

15. A computer program product comprising a non-transitory computer usable medium storing a computer readable program, wherein the computer readable program when executed on a computer causes the computer to:

retrieve route data describing historical routes traveled by a group of first users and map data describing a map;

match the historical routes to the map;

identify one or more intersections associated with the historical routes on the map;

determine a maneuver ratio for one of the intersections based on the route data, the maneuver ratio describing a ratio of a maneuver that the group of first users has taken at the one of the intersections;

generate a probability model including one or more maneuver ratios for the one or more intersections;

retrieve position data associated with a second user, the position data describing a position of the second user on the map;

estimate probabilities for a set of routes that the second user may take based on the probability model;

determine a most likely route for the second user from the set of routes based on the probabilities for the set of routes; and provide useful information associated with the most likely route for display to the second user.

16. The computer program product of claim 15, wherein the maneuver includes one or more of a right turn, a left turn, a U-turn and going straight.

17. The computer program product of claim 15, wherein the computer readable program is further configured to:

determine one or more journey factors associated with the historical routes traveled by the group of first users and associated with the one or more intersections; and determine the probability model based on the one or more journey factors, the probability model corresponding to the one or more journey factors and generated based on the historical routes characterized by the one or more journey factors.

18. The computer program product of claim 17, wherein the one or more journey factors include one or more of a day of a week, a time of a day, weather of a day, whether a day is a national holiday, whether rain is present during a day, what a starting point of one of the historical routes is, what a destination of one of the historical routes is, what a stopping point along one of the historical routes is, an elapsed distance of one of the historical routes and an elapsed time of one of the historical routes.

19. The computer program product of claim 15, wherein the computer readable program is further configured to:

identify an intersection associated with the second user;

calculate probabilities of maneuvers that the second user may take at the intersection based on the probability model; and determine a most likely maneuver that the second user may take at the intersection based on the probabilities of maneuvers.

20. The computer program product of claim 15, wherein the useful information associated with the most likely route includes information related to one or more of attractions, amenities, incidents, traffic delay, and road closure information along the most likely route.

* * * * *